United States Patent
Fan et al.

(10) Patent No.: US 9,807,656 B2
(45) Date of Patent: Oct. 31, 2017

(54) METHOD AND UE FOR PERFORMING RANDOM ACCESS TO BASE STATION, AND METHOD AND BASE STATION FOR ESTABLISHING CONNECTION WITH UE

(71) Applicant: Telefonaktiebolaget L M Ericsson (publ), Stockholm (SE)

(72) Inventors: Rui Fan, Beijing (CN); Shaohua Li, Beijing (CN); Qianxi Lu, Beijing (CN); Xinghua Song, Beijing (CN); Haochuan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 11 days.

(21) Appl. No.: 14/783,508

(22) PCT Filed: Apr. 18, 2013

(86) PCT No.: PCT/CN2013/074359
§ 371 (c)(1),
(2) Date: Oct. 9, 2015

(87) PCT Pub. No.: WO2014/169460
PCT Pub. Date: Oct. 23, 2014

(65) Prior Publication Data
US 2016/0066228 A1    Mar. 3, 2016

(51) Int. Cl.
*H04W 36/08* (2009.01)
*H04W 74/00* (2009.01)
(Continued)

(52) U.S. Cl.
CPC ....... *H04W 36/08* (2013.01); *H04W 74/0833* (2013.01); *H04W 76/02* (2013.01); *H04W 72/0446* (2013.01); *H04W 74/002* (2013.01)

(58) Field of Classification Search
CPC . H04W 36/08; H04W 74/0833; H04W 76/02; H04W 72/0446; H04W 74/002
See application file for complete search history.

(56) References Cited

U.S. PATENT DOCUMENTS 9,319,188 B2*  4/2016  Yin .................. H04L 5/001
2012/0327821 A1  12/2012  Lin et al.
(Continued)

FOREIGN PATENT DOCUMENTS

CN    101827356 A    9/2010
CN    101969697 A    2/2011
(Continued)

OTHER PUBLICATIONS

Title: Dual Connectivity for UEs Supporting One UL CC; Source: Intel Corporation; 3GPP TSG RAN WG2 Meeting #81 bis; Chicago, USA (R2-131410)—Apr. 15-19, 2013.
(Continued)

*Primary Examiner* — Brian D Nguyen
(74) *Attorney, Agent, or Firm* — Baker Botts, LLP

(57) ABSTRACT

The present disclosure relates to a method used in a UE for performing a random access to a second base station and an associated UE. The UE has been in communications with a first base station. The method includes: obtaining from the first base station a subframe configuration for the UE, which indicates a first set of subframes assigned to communications between the UE and the first base station and a second set of subframes assigned to communications between the UE and the second base station; and performing the random access to the second base station based on the subframe configuration. The present disclosure also relates to a method used in a second base station for establishing a connection with a UE and an associated second base station.

28 Claims, 7 Drawing Sheets

(51) Int. Cl.
*H04W 76/02* (2009.01)
*H04W 74/08* (2009.01)
*H04W 72/04* (2009.01)

(56) References Cited

U.S. PATENT DOCUMENTS

| | | | |
|---|---|---|---|
| 2013/0208604 A1* | 8/2013 | Lee | H04L 25/0226 370/252 |
| 2013/0223366 A1* | 8/2013 | Papasakellariou | H04W 72/042 370/329 |
| 2014/0092823 A1* | 4/2014 | Song | H04L 1/00 370/329 |
| 2014/0119334 A1* | 5/2014 | Kazmi | H04W 24/10 370/330 |
| 2014/0198773 A1* | 7/2014 | Yin | H04L 5/001 370/336 |
| 2014/0200001 A1* | 7/2014 | Song | H04W 36/0094 455/436 |
| 2014/0241225 A1* | 8/2014 | Novak | H04W 72/02 370/311 |

FOREIGN PATENT DOCUMENTS

| | | |
|---|---|---|
| CN | 102158964 A | 8/2011 |
| CN | 102 523 627 | 6/2012 |
| CN | 102511189 A | 6/2012 |
| CN | 102651907 A | 8/2012 |
| CN | 102835171 A | 12/2012 |
| WO | WO 2012/067406 A2 | 5/2012 |
| WO | WO 2013/009089 A2 | 1/2013 |
| WO | WO 2013/009089 A3 | 4/2013 |

OTHER PUBLICATIONS

Title: RAN1 Related Issues for Support of Dual Connectivity Between Macro Cell and Small Cell; Source: LG Electronics; 3GPP TSG RAN WG1 #72bis; Chicago, USA (R1-131300)—Apr. 15-19, 2013.

Title: PCell vs. SCell With PUCCH for Inter-ENB CA/COMP; Source: Sharp; 3GPP TSG-RAN WG2 #81 bis; Chicago, USA (R2-131165)—Apr. 15-19, 2013.

Supplementary European Search Report for Application No. EP 13 88 2294—dated Nov. 29, 2016.

PCT Notification of Transmittal of the International Search Report and the Written Opinion of the International Searching Authority, or the Declaration for International application No. PCT/CN2013/074359, dated Jan. 23, 2014.

3GPP TS 36.213 V12.5.0; Technical Specification; 3rd Generation Partnership Project; Technical Specification Group Radio Access Network; Evolved Universal Terrestrial Radio Access (E-UTRA) Physical layer procedures (Release 12), Mar. 2015.

* cited by examiner

METHOD AND UE FOR PERFORMING RANDOM ACCESS TO BASE STATION, AND METHOD AND BASE STATION FOR ESTABLISHING CONNECTION WITH UE

PRIORITY

This nonprovisional application is a U.S. National Stage Filing under 35 U.S.C. §371 of International Patent Application Serial No. PCT/CN2013/074359, filed Apr. 18, 2013, and entitled "METHOD AND UE FOR PERFORMING RANDOM ACCESS TO BASE STATION, AND METHOD AND BASE STATION FOR ESTABLISHING CONNECTION WITH UE."

TECHNICAL FIELD

The technology presented in this disclosure generally relates to radio communication networks. More particularly, the present disclosure relates to a method used in a UE having been connection with a first base station for performing a random access to a second base station, and an associated UE; and a method used in a second base station for establishing a connection with a UE having been in connection with a first base station, and an associated second base station.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

With the evolution of Long Term Evolution (LTE) system, LTE network switches from a homogeneous network into a heterogeneous network, where Macro eNode-Bs (eNBs) have higher transmission power for coverage purpose and pico eNBs have lower transmission power for capacity purpose. As verified, the handover failure rate is increased in such a heterogeneous network. It is therefore proposed that UE is connected to both a Macro eNB and a pico eNB concurrently, which is called dual connectivity, as shown in FIG. 1.

Dual connectivity is a feature defined from the UE's perspective, where a UE may simultaneously receive from and transmit to at least two different network points as shown in FIG. 1. Dual connectivity is one of the features that are being standardized within the umbrella work of small cell enhancements within 3GPP Rel-12.

Dual connectivity is defined for the case when the aggregated network points operate on the same or separate frequency. Each network point that the UE is aggregating may define a stand-alone cell or it may not define a stand-alone cell. It is further foreseen that from the UE's perspective, the UE may apply some form of Time Division Multiplexing (TDM) scheme between the different network points that the UE is aggregating. This implies that the communication on the physical layer to and from the different aggregated network points may not be truly simultaneous.

Dual connectivity as a feature bears many similarities with carrier aggregation and Coordinated Multi Point Transmission/Reception (CoMP). The main differentiating factor is that dual connectivity is designed considering a relaxed backhaul and less stringent requirements on synchronization requirements between the network points. This is in contrast to carrier aggregation and CoMP, where tight synchronization and a low-delay backhaul are assumed between connected network points.

Due to complicacy, some UEs support dual connectivity at Layer 2 and Layer 3. In other word, their physical layer can only connect with either Macro eNB or pico eNB at the same time slot. In order for this type of UE to work in dual connectivity scenario, subframes have to be split into two sets, subframes within one set are used for communications between UE and Macro eNB, subframes within the other set are used for communications between UE and pico eNB.

Then one issue is how to guarantee the second random access procedure success for this TDM type UE in dual connectivity scenario, as there is strict timing requirement for MSG3 transmission in contention based random access or MSG1 transmission in contention free random access procedure according to the specification (referring to Section 8 in the 3*GPP Technical Specification* 3*GPP TS* 36.213, "*Evolved Universal Terrestrial Radio Access (E-UTRA); Physical layer procedures*", v.11.1.0).

SUMMARY

It is in view of the above considerations and others that the various embodiments of the present technology have been made.

According to a first aspect of the present disclosure, there is proposed a method used in a UE for performing a random access to a second base station. The UE has been in communications with a first base station. The method includes obtaining from the first base station a subframe configuration for the UE, which indicates a first set of subframes assigned to communications between the UE and the first base station and a second set of subframes assigned to communications between the UE and the second base station. The method further includes performing the random access to the second base station based on the subframe configuration.

According to a second aspect of the present disclosure, there is proposed a method used in a second base station for establishing a connection with a UE. The UE has been in a connection with a first base station. The method includes obtaining from the first base station a subframe configuration for the UE, which indicates a first set of subframes assigned to communications between the UE and the first base station and a second set of subframes assigned to communications between the UE and the second base station. The method further includes transmitting to the UE a Physical Downlink Control Channel, PDCCH, order for initiating the random access.

According to a third aspect of the present disclosure, there is proposed a UE having been in communications with a first base station for performing a random access to a second base station. The UE includes an obtaining unit configured to obtain from the first base station a subframe configuration for the UE, which indicates a first set of subframes assigned to communications between the UE and the first base station and a second set of subframes assigned to communications between the UE and the second base station. The UE further includes a random access performing unit configured to perform the random access to the second base station based on the subframe configuration.

According to a fourth aspect of the present disclosure, there is proposed a second base station for establishing a connection with a UE. The UE has been in a connection with a first base station. The second base station includes an obtaining unit configured to obtain from the first base station a subframe configuration for the UE, which indicates a first set of subframes assigned to communications between the UE and the first base station and a second set of subframes assigned to communications between the UE and the second base station. The second base station further includes a first transmitting unit configured to transmit to the UE a Physical Downlink Control Channel, PDCCH, order for initiating the random access.

According to fifth aspect of the present disclosure, there is proposed a UE, for establishing a connection with a second base station. The UE has been in a connection with a first base station. The UE includes a processing circuit configured to perform the method according to the above first aspect of the present disclosure.

According to sixth aspect of the present disclosure, there is proposed a second base station for establishing a connection with a UE. The UE has been in a connection with a first base station. The second base station includes a processing circuit configured to perform the method according to the above second aspect of the present disclosure.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

Figure 1:
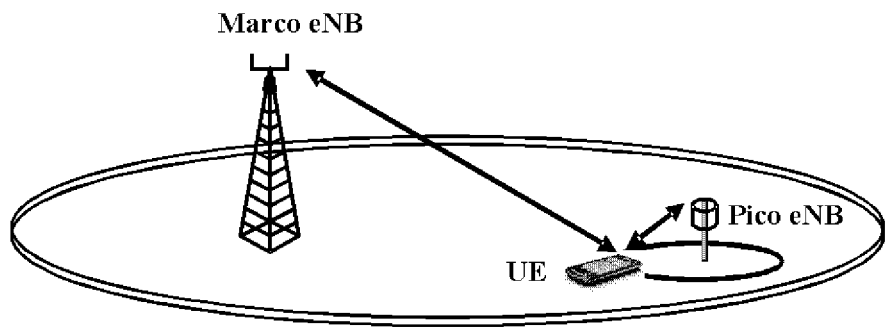
FIG. 1 is an illustration of dual connectivity.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

As used hereinafter, it should be appreciated the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC (Machine Type Communication) devices, which do not necessarily involve human interaction.

Also, the term "base station" as used herein may be referred to as a radio base station, a NodeB or an evolved NodeB (eNB), access point, relay node, etcetera.

An LTE User Equipment (UE) can only be scheduled for uplink (UL) transmission if its UL transmission timing is synchronized. The LTE Random Access CHannel (RACH) therefore plays a key role as an interface between non-synchronized UEs and the orthogonal transmission scheme of the LTE UL radio access.

In WCDMA, the RACH is primarily used for initial network access and short message transmission. LTE likewise uses the RACH for initial network access, but in LTE the RACH cannot carry any user data, which is exclusively sent on the Physical Uplink Shared CHannel (PUSCH). Instead, the LTE RACH is used to achieve UL time synchronization for a UE which either has not yet acquired, or has lost, its UL synchronization. Once UL synchronization is achieved for a UE, the eNB can schedule orthogonal UL transmission resources for it. Relevant scenarios in which the RACH is used are therefore:

(1) A UE in RRC_CONNECTED state, but not UL-synchronized, needing to send new UL data or control information (e.g. an event-triggered measurement report);

(2) A UE in RRC_CONNECTED state, but not UL-synchronized, needing to receive new downlink (DL) data, and therefore to transmit corresponding ACK/NACK in the UL;

(3) A UE in RRC_CONNECTED state, handing over from its current serving cell to a target cell;

(4) A transition from RRC_IDLE state to RRC_CONNECTED, for example for initial access or tracking area updates;

(5) Recovering from radio link failure.

One additional exceptional case is that an UL-synchronized UE is allowed to use the RACH to send a Scheduling Request (SR) if it does not have any other UL resource allocated in which to send the SR. These roles require the LTE RACH to be designed for low latency, as well as good detection probability at low Signal-to-Noise (SNR) (for cell edge UEs undergoing handover) in order to guarantee similar coverage to that of the PUSCH and Physical Uplink Control CHannel (PUCCH).

A successful RACH attempt should allow subsequent UE transmissions to be inserted among the scheduled synchronized transmissions of other UEs. This sets the required timing estimation accuracy which must be achievable from the RACH, and hence the required RACH transmission bandwidth: due to the Cyclic Prefix (CP) of the UL transmissions, the LTE RACH only needs to allow for round-trip delay estimation (instead of the timing of individual channel taps), and this therefore reduces the required RACH bandwidth compared to WCDMA.

This is beneficial in minimizing the overhead of the RACH, which is another key consideration. Unlike in WCDMA, the RACH should be able to be fitted into the orthogonal time-frequency structure of the UL, so that an eNB which wants to avoid interference between the RACH and scheduled PUSCH/PUCCH transmissions can do so. It is also important that the RACH is designed so as to minimize interference generated to adjacent scheduled PUSCH/PUCCH transmissions.

The LTE random access procedure comes in two forms, allowing access to be either contention-based (implying an inherent risk of collision) or contention-free.

A UE initiates a contention-based random access procedure for all use-cases listed as above. In this procedure, a random access preamble signature is randomly chosen by the UE, with the result that it is possible for more than one UE simultaneously to transmit the same signature, leading to a need for a subsequent contention resolution process.

For the above scenarios (2) (new DL data) and (3) (handover), the eNB has the option of preventing contention occurring by allocating a dedicated signature to a UE, resulting in contention-free access. This is faster than contention-based access—a factor which is particularly important for the case of handover, which is time-critical.

Unlike in WCDMA, a fixed number (64) of preamble signatures is available in each LTE cell, and the operation of the two types of RACH procedure depends on a partitioning of these signatures between those for contention-based access and those reserved for allocation to specific UEs on a contention-free basis.

Figure 2:
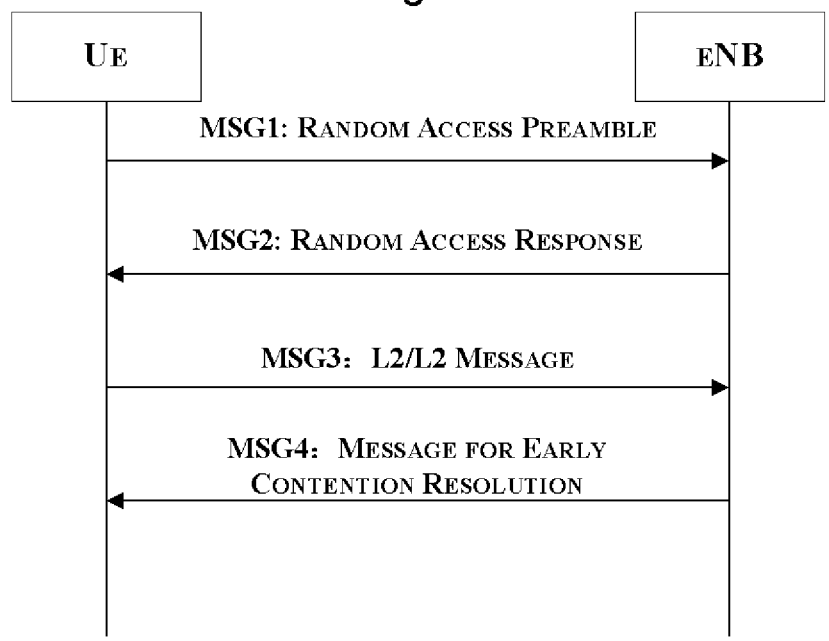
FIG. 2 illustrates the current contention-based random access procedure.

FIG. 2 illustrates the current random access procedure consisting of the following four steps:
Step 1: Random access preamble transmission (MSG1);
Step 2: Random access response (MSG2);
Step 3: Layer 2/Layer 3 (L2/L3) message (MSG3);
Step 4: Contention resolution message (MSG4).

As shown in FIG. 2, this is a contention-based random access procedure.

Figure 3:
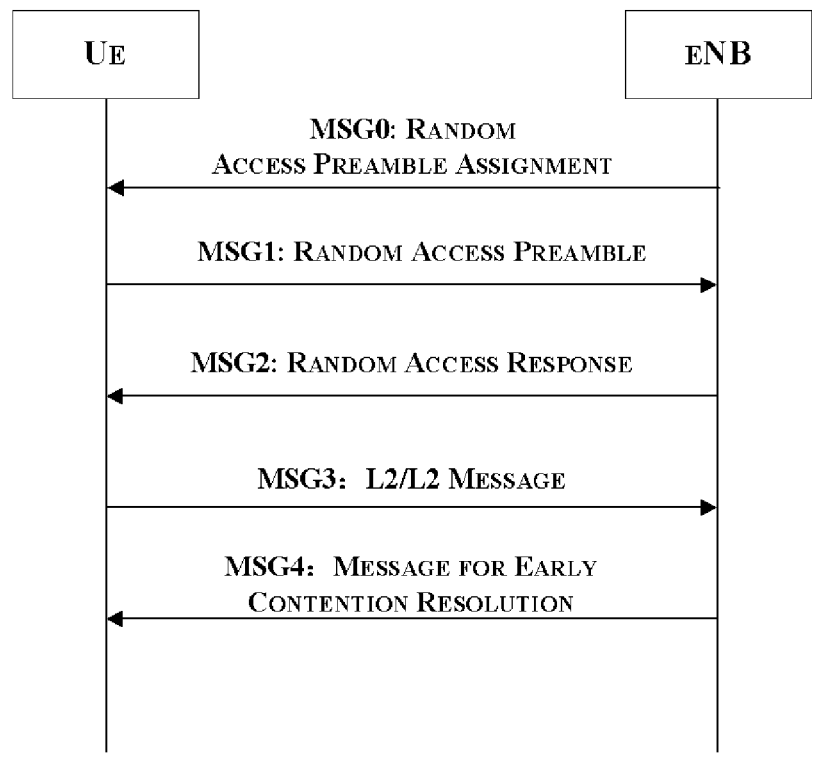
FIG. 3 illustrates the current contention-free random access procedure.

FIG. 3 illustrates the current random access procedure consisting of the following five steps:
Step 1: Random access preamble assignment (MSG0), e.g., a PDCCH order;
Step 2: Random access preamble transmission (MSG1);
Step 3: Random access response (MSG2);
Step 4: Layer 2/Layer 3 (L2/L3) message (MSG3);
Step 5: Contention resolution message (MSG4).

As shown in FIG. 3, this is a contention-free random access procedure.

In the current 3GPP specification, the timing requirement of RACH procedure is described as follows:
For the L1 random access procedure, UE's UL transmission timing after a random access preamble transmission is as follows.

a. If a PDCCH with associated RA-RNTI is detected in subframe n, and the corresponding DL-SCH transport block contains a response to the transmitted preamble sequence, the UE shall, according to the information in the response, transmit an UL-SCH transport block in the first subframe $n+k_1$, $k_1 \geq 6$, if the UL delay field in section 6.2 is set to zero where $n+k_1$ is the first available UL subframe for PUSCH transmission. The UE shall postpone the PUSCH transmission to the next available UL subframe after $n+k_1$ if the field is set to 1.

b. If a random access response is received in subframe n, and the corresponding DL-SCH transport block does not contain a response to the transmitted preamble sequence, the UE shall, if requested by higher layers, be ready to transmit a new preamble sequence no later than in subframe n+5.

c. If no random access response is received in subframe n, where subframe n is the last subframe of the random access response window, the UE shall, if requested by higher layers, be ready to transmit a new preamble sequence no later than in subframe n+4.

In case a random access procedure is initiated by a "PDCCH order" in subframe n, the UE shall, if requested by higher layers, transmit random access preamble in the first subframe $n+k_2$, $k_2 \geq 6$, where a PRACH resource is available.

For example, if the eNB transmits MSG2 in subframe n, the UE should responds MSG 3 in subframe n+k, k≥6.

As discussed in the above, MSG3 will be transmitted at the first UL subframe which is 6 subframe later than the MSG2 if UL_delay is set to 0 or the next available UL subframe after 6 subframes if UL_delay is set to 1 and MSG 1 will be transmitted at the first UL subframe which is 6 subframe later than MSG 0 if that subframe contain PRACH resource.

With TDM limitation in dual connectivity scenario, subframes have to be split into two different sets of subframes for a TDM UE when it is connected to both a Macro eNB and a pico eNB:
1) One set of subframes for communications between the Macro eNB and the UE;
2) The other set of subframes for communications between the pico eNB and the UE.

The Macro eNB and the pico eNB are of illustrative, and any other suitable types of eNBs may be applicable to such a subframe partitioning.

So the problem is that a UL subframe specified for MSG3 or MSG1 for the second random access procedure, according to the current 3GPP specification, may probably be not within the set of subframes for communications between the UE and the corresponding eNB.

For example, when a UE is initiating a random access procedure within a pico cell, if it has already setup connections with a Macro eNB (or it has been in communications with the Macro eNB), a UL subframe specified for MSG3/MSG1 may be within the set of subframes for communications between the Macro eNB and the UE. When the UE is initiating a random access procedure within a Macro cell, if it has already setup connections with a pico eNB (or it has been in communications with the pico eNB), a UL subframe specified for MSG3/MSG1 may be within the set of subframes for communications between the pico eNB and the UE.

Figure 4:
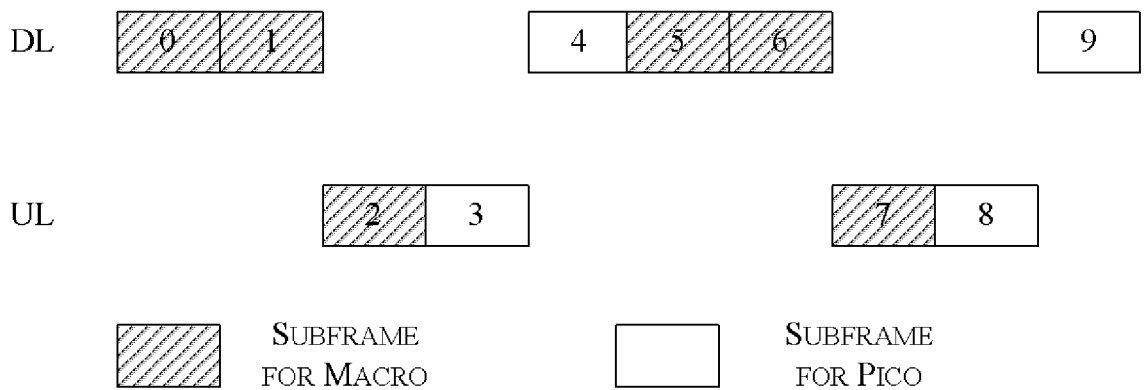
FIG. 4 is an example of splitting subframes of a system frame into two sets of subframes for Macro eNB and pico eNB.

One example is shown in FIG. 4, where 10 subframes of a system frame n are split into two sets of subframes. The set of subframes, {0,1,2,5,6,7}, is used for communications between a UE and a Macro eNB, and the set of subframes, {3,4,8,9}, is used for communications between the UE and a pico eNB. This is a reasonable subframe split for TDD configuration 1. When the pico eNB transmits MSG2 to the UE in subframe 4 of the system frame n, in accordance with the current 3GPP specification, MSG3 needs to be transmitted in subframe 2 of system frame n+1 if UL_delay is set to 0. However, it can be seen from FIG. 4 that subframe 2 is not within the set of subframes for communications between the UE and the pico eNB.

When the pico eNB transmits MSG0 to the UE in subframe 4 of the system frame n, in accordance with the current 3GPP specification, MSG1 needs to be transmitted in subframe 2 of system frame n+1 if UL_delay is set to 0. However, it can be seen from FIG. 4 that subframe 2 is not within the set of subframes for communications between the UE and the pico eNB.

Consequently, for a UE operating in a TDM mode, the second random access procedure for the UE may fail since a subframe specified for MSG3/MSG1 transmission may not fall within the subframe set for communications between the UE and the second eNB.

In order to guarantee a TDM UE's random access procedure success in dual connectivity scenario, in accordance with the present disclosure, the eNB needs to know whether the UE initiating random access in dual connectivity scenario works in TDM mode or not. Moreover, for UEs working in TDM mode for dual connectivity, a UE and a corresponding eNB need to make a UL subframe for MSG3/MSG1 be within a set of subframes for communications between the UE and the eNB.

The present disclosure modifies the existing timing requirement of RACH procedure as provisioned in the current 3GPP specification as follows:

For the L1 random access procedure, UE's UL transmission timing after a random access preamble transmission is as follows.
  a. If a PDCCH with associated RA-RNTI is detected in subframe n, and the corresponding DL-SCH transport block contains a response to the transmitted preamble sequence, the UE shall, according to the information in the response, transmit an UL-SCH transport block in the first subframe $n+k_1$, $k_1 \geq 6$, if the UL delay field in section 6.2 is set to zero where $n+k_1$ is the first available UL subframe of the connection between UE and the corresponding eNB for PUSCH transmission. The UE shall postpone the PUSCH transmission to the next available UL subframe of the connection between UE and the corresponding eNB after $17+k_1$ if the field is set to 1.
  b. If a random access response is received in subframe n, and the corresponding DL-SCH transport block does not contain a response to the transmitted preamble sequence, the UE shall, if requested by higher layers, be ready to transmit a new preamble sequence no later than in subframe n+5.
  c. If no random access response is received in subframe n, where subframe n is the last subframe of the random access response window, the UE shall, if requested by higher layers, be ready to transmit a new preamble sequence no later than in subframe n+4.

In case a random access procedure is initiated by a "PDCCH order" in subframe n, the UE shall, if requested by higher layers, transmit random access preamble in the first subframe $n+k_2$, $k_2 \geq 6$, where a PRACH resource is available and $n+k_2$ is the first available UL subframe of the connection between UE and the corresponding eNB.

Consequently, besides the limitation as specified in the current 3GPP specification, the subframe for MSG3/MSG1 should be within the set of subframes for communications between the UE and the corresponding eNB.

Hereunder, some embodiments will be explained in details on how to select a valid UL subframe for MSG1 and MSG 3, respectively.

Figure 5:
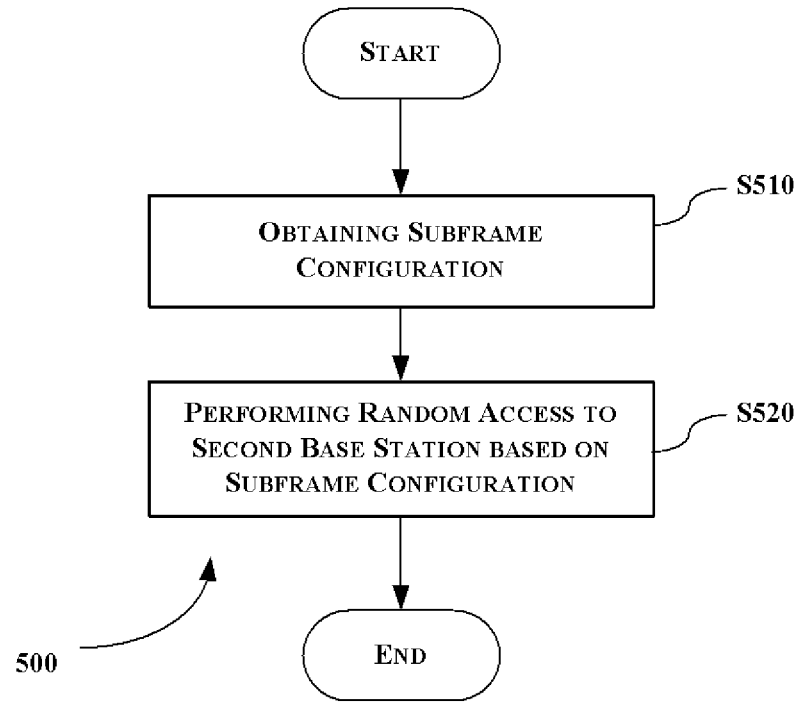
FIG. 5 is a flowchart of a method used in a UE for performing a random access to a second base station according to a first embodiment of the present disclosure.

FIG. 5 shows a flowchart of a method 500 used in a UE for performing a random access to a second base station according to a first embodiment of the present disclosure, where the UE has been in communications with a first base station.

As shown in FIG. 5, a subframe configuration for the UE is obtained from the first base station (step S510). The subframe configuration indicates a first set of subframes assigned to communications between the UE and the first base station and a second set of subframes assigned to communications between the UE and the second base station. Then, the random access is performed to the second base station based on the subframe configuration (step S520).

In the present disclosure, the step S520 may particularly include a step of receiving from the second base station MSG0 for initiating the random access. Then, if MSG0 is received in subframe m, m being a positive integer, the step S520 may further include a step of: transmitting MSG1 to the second base station in the first available UL subframe in the second set of subframes following a subframe $m+k_1$, $k_1 \geq 6$, if the subframe $m+k_1$ is not in the second set of subframes. Alternatively, the step S520 may further include a step of: transmitting MSG1 to the second base station in the subframe $m+k_1$, if the subframe $m+k_1$ is in the second set of subframes.

In this embodiment, MSG0 indicates a PDCCH order, and MSG 1 indicates a random access preamble, as specified in the current 3GPP specification.

In the present disclosure, before receiving the PDCCH order, the method 500 may further include: informing the second base station via the first base station that the UE is going to establish the connection with the second base station.

In the present disclosure, the step S520 may include: receiving MSG2 from the second base station in subframe n, n being a positive integer; and transmitting MSG3 to the second base station in the first available UL subframe in the second set of subframes following a subframe $n+k_2$, $k_2 \geq 6$, if the subframe $n+k_2$ is in not the second set of subframes. In this example, the step S520 may further include: transmitting MSG3 to the second base station in the subframe $n+k_2$, if the subframe $n+k_2$ is in the second set of subframes.

In this embodiment, MSG2 indicates an associated Random Access-Radio Network Temporary Identity, RA-RNTI, and MSG3 indicates an UL-Sharing Channel, UL-SCH, transport block, as specified in the current 3GPP specification.

In the present disclosure, the method 500 may further include: informing the second base station of the subframe configuration by using one or more designated preamble indices or in one or more designated Physical Radom Access Channel, PRACH, subframes.

Figure 6:
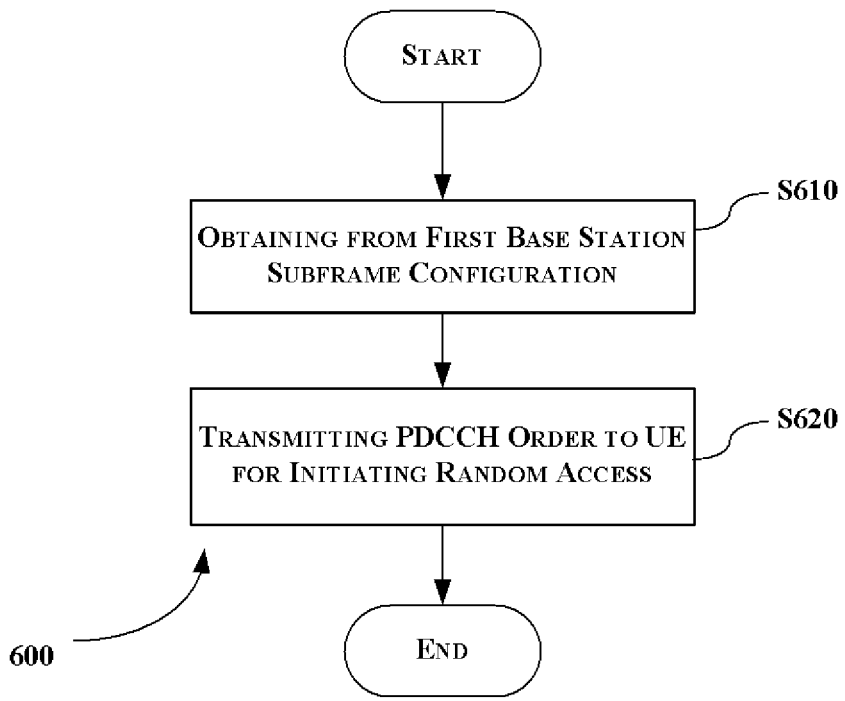
FIG. 6 is a flowchart of a method used in a UE for performing a random access to a second base station according to a second embodiment of the present disclosure.

FIG. 6 shows a flowchart of a method 600 used in a second base station for establishing a connection with a UE is proposed according to a second embodiment of the present disclosure, where the UE has been in communications with a first base station.

As shown in FIG. 6, a subframe configuration for the UE is obtained from the first base station (step S610). The subframe configuration indicates a first set of subframes assigned to communications between the UE and the first base station and a second set of subframes assigned to communications between the UE and the second base station. Then, MSG0 is transmitted to the UE for initiating the random access (step S620).

Assume that MSG0 is transmitted to the UE in subframe m, wherein m is a positive integer. In the present disclosure, the method 600 may further include a step of receiving MSG1 from the UE in the first available UL subframe that is allowed to transmit PRACH in the second set of subframes following a subframe $m+k_1$, if the subframe $m+k_1$ is not in the second set of subframes. Alternatively, the method 600 may further include a step of receiving MSG1 from the UE in the subframe $m+k_1$, if the subframe $m+k_1$ is in the second set of subframes.

In this embodiment, MSG0 indicates a PDCCH order, and MSG1 indicates a random access preamble, as specified in the current 3GPP specification.

In the present disclosure, the method 600 may further include steps of: transmitting MSG2 to the UE in subframe n, n being a positive integer; and receiving MSG3 from the UE in the first available UL subframe in the second set of subframes following a subframe $n+k_2$, $k_2 \geq 6$, if the subframe $n+k_2$ is not in the second set of subframes. Alternatively, the method 600 may further include a step of receiving MSG3 from the UE in the subframe $n+k_2$, if the subframe $n+k_2$ is in the second set of subframes.

In this embodiment, MSG2 indicates an associated Random Access-Radio Network Temporary Identity, RA-RNTI, and MSG3 indicates an UL-Sharing Channel, UL-SCH, transport block, as specified in the current 3GPP specification.

Hereunder, examples will be explained in details by assuming the subframe configuration of FIG. 4 as that of a given system frame n. As shown in FIG. 4, the set of subframes for communications between a UE and a pico eNB is {3, 4, 8, 9}.

Example 1—MSG3 Transmission

When the pico eNB transmits MSG2 to a UE in subframe 4 of system frame n, the UE will transmit MSG3 in subframe 3 of system frame n+1, instead of subframe 2 of system frame n+1 as specified in the current 3GPP specification.

Example 2—MSG1 Transmission

When the pico eNB transmits MSG0 to a UE in subframe 4 of system frame n, the UE will transmit MSG1 in subframe 3 of system frame n+1, instead of subframe 2 of system frame n+1 as specified in the current 3GPP specification.

With the proposed schemes, a UE operating in a TDM mode can work in a dual connectivity scenario and set up dual links.

As discussed in the above, TDM limitation only applies when a UE already has a first connection with a base station and is trying to setup a second connection with another base station. Hence, a random access procedure for the first connection is not impacted by TDM limitation and the network can know this is a TDM UE via the first connection. Since UE initiates random access procedure either triggered by DL data or triggered by UL data, the TDM requirement on second random access procedure may be considered differently. As well known in the art, a random access procedure triggered by DL data may be also referred to as a contention-free random access procedure, and a random access procedure triggered by UL data may be also referred to as a contention-based random access procedure.

Hereunder, the present disclosure will be described in details in considering whether the random access procedure is triggered by DL data or triggered by UL data by referring to FIGS. 7-11 in a scenario involving a UE, a first eNB and a second eNB, and the UE has been in communication with the first eNB and is trying to access the second eNB. That is, the UE here operates in a TDM mode and thus may be referred to as a TDM UE, and a subframe configuration of the UE indicates a first set of subframes assigned to communications between the UE and the first eNB and a second set of subframes assigned to communications between the UE and the second eNB.

Figure 7:
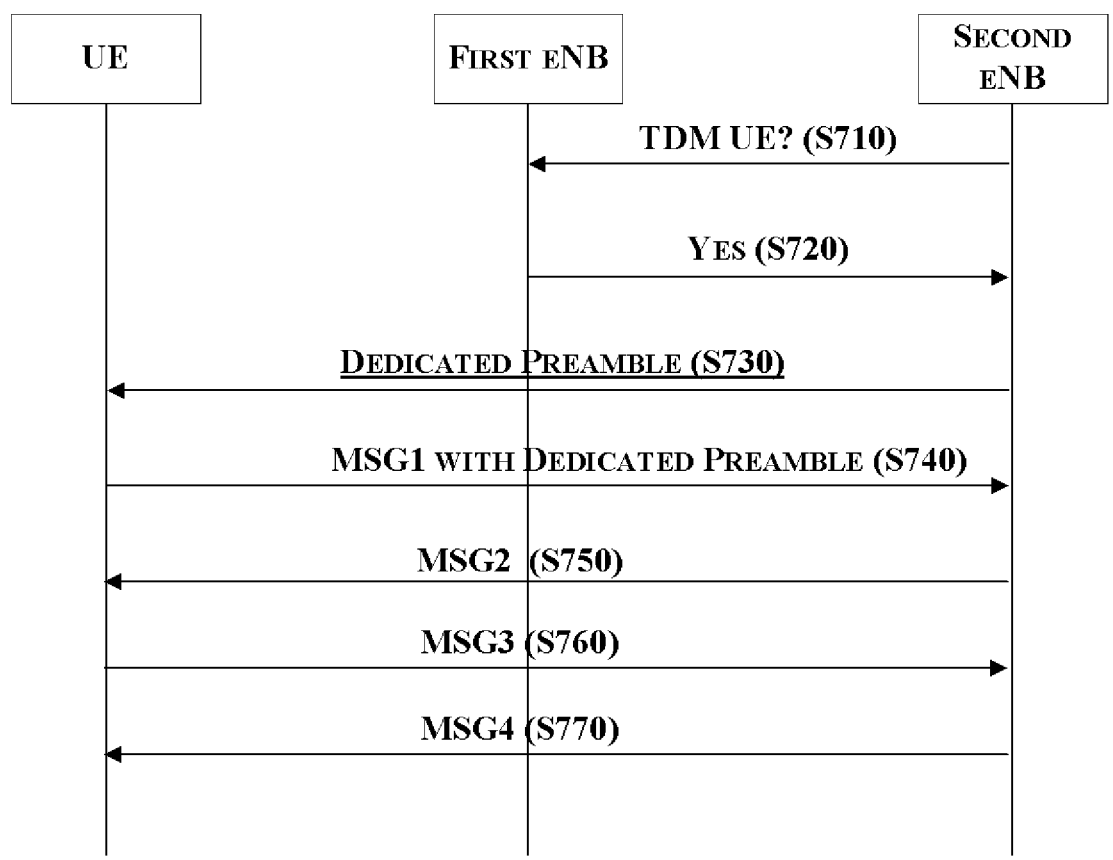
FIG. 7 shows a sequence diagram illustrating a random access procedure triggered by new DL data according to the present disclosure.

FIG. 7 shows a sequence diagram illustrating a random access procedure triggered by new DL data (i.e., a contention-free random access procedure) according to the present disclosure.

As shown in FIG. 7, the second eNB may identify if the UE is a TDM UE via its cooperation with the first eNB (step S710). If yes (step S720) (thereby, the second eNB can obtain the subframe configuration of the UE), the second eNB may allocate a dedicated preamble to the TDM UE and directly transmits the dedicated preamble to the UE by including the dedicated preamble in a PDCCH order (i.e., MSG0) (step S730).

Then UE transmits MSG1 with the dedicated preamble to the second eNB (step S740). Assume that the PDCCH order is transmitted in subframe m. In accordance with the present disclosure, if the subframe $m+k_1$ is not in the second set of subframes, the UE transmits MSG1 with the dedicated preamble to the second eNB in the first available UL subframe in the second set of subframes following a subframe $m+k_1$, $k_1 \geq 6$.

At step S750, the second eNB transmits MSG 2 to the UE. As a response, the UE transmits MSG3 to the second eNB (step S760). Assume that MSG2 is transmitted in subframe n. In accordance with the present disclosure, if the subframe $n+k_2$ is not in the second set of subframes, the UE transmits MSG2 to the second eNB in the first available UL subframe in the second set of subframes following a subframe $n+k_2$, $k_2 \geq 6$.

At step S770, the second eNB transmits MSG4 to the UE, and then the random access procedure ends.

Figure 8:
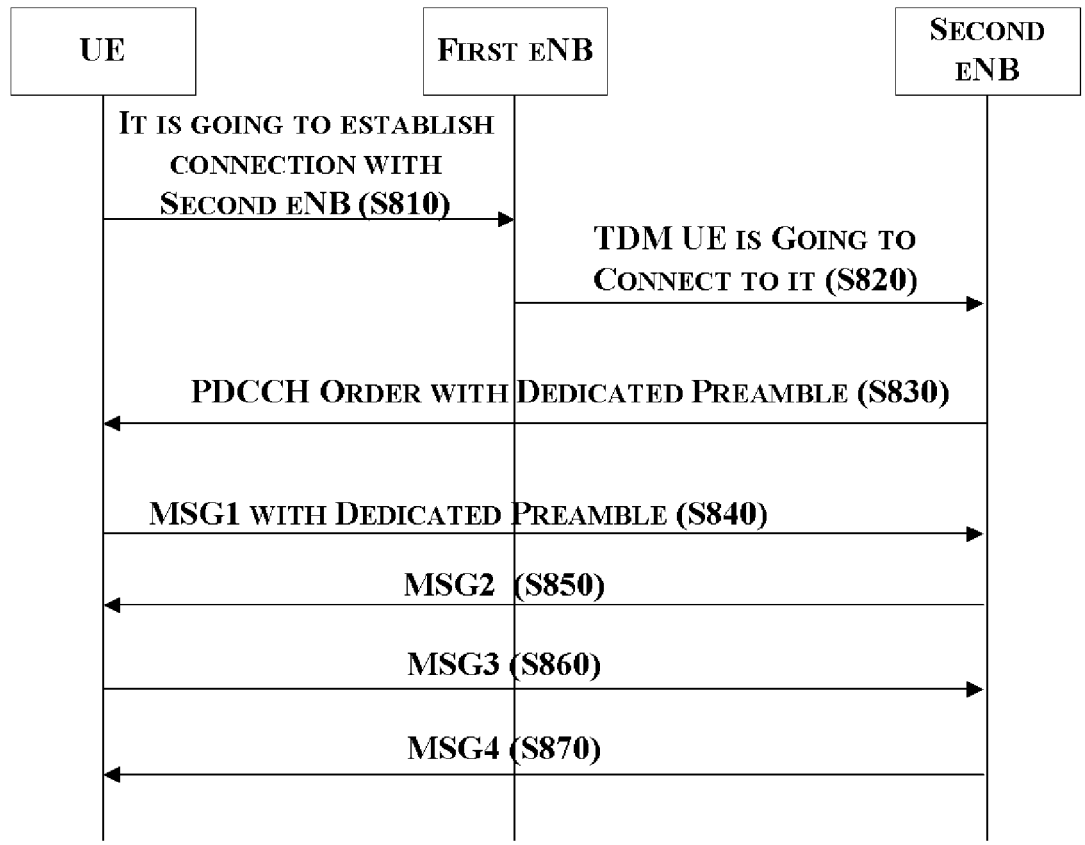
FIG. 8 shows a sequence diagram illustrating a random access procedure triggered by new DL data according to the present disclosure.

FIG. 8 shows a sequence diagram illustrating a random access procedure triggered by new UL data (i.e., a contention-based random access procedure) according to the present disclosure.

As shown in FIG. 8, the TDM UE firstly informs the first eNB that it is going to initiate a random access with the second eNB (step S810). The first eNB informs the second eNB that a TDM UE is going to connect it via random access procedure (step S820). The second eNB then allocate a dedicated preamble for this TDM UE and directly transmits the dedicated preamble to the UE by including the dedicated preamble in a PDCCH order (i.e., MSG0) (step S830).

Then UE transmits MSG1 with the dedicated preamble to the second eNB (step S840). Assume that the PDCCH order is transmitted in subframe m. In accordance with the present disclosure, if the subframe $m+k_1$ is not in the second set of subframes, the UE transmits MSG1 with the dedicated preamble to the second eNB in the first available UL subframe in the second set of subframes following a subframe $m+k_1$, $k_1 \geq 6$.

At step S850, the second eNB transmits MSG 2 to the UE. As a response, the UE transmits MSG3 to the second eNB (step S860). Assume that MSG2 is transmitted in subframe n. In accordance with the present disclosure, if the subframe $n+k_2$ is not in the second set of subframes, the UE transmits MSG2 to the second eNB in the first available UL subframe in the second set of subframes following a subframe $n+k_2$, $k_2 \geq 6$.

At step S870, the second eNB transmits MSG4 to the UE, and then the random access procedure ends.

Figure 9:
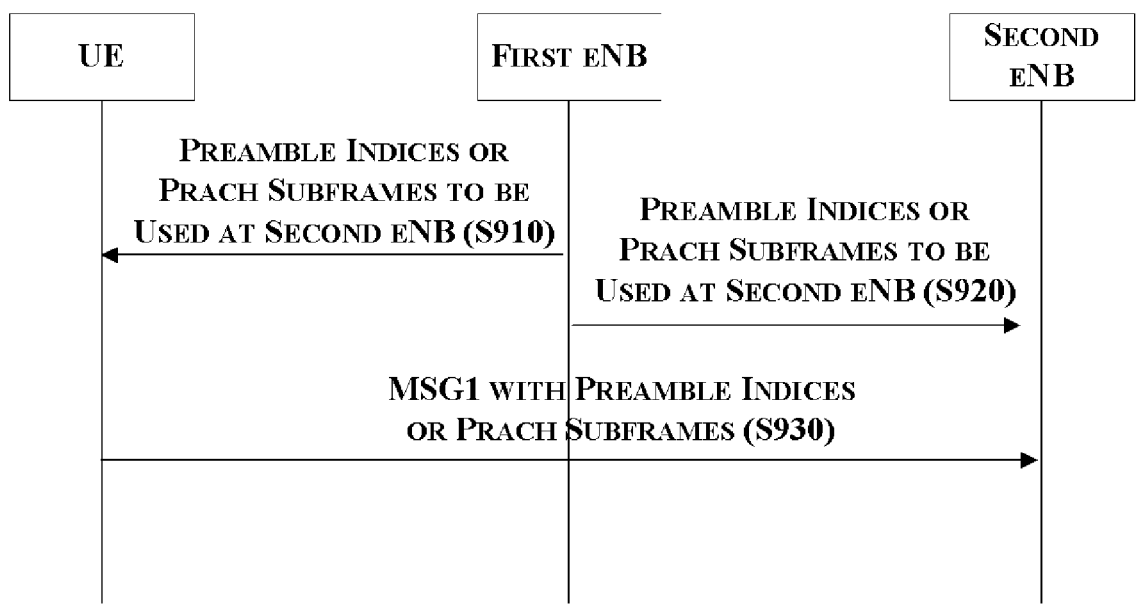
FIG. 9 shows a sequence diagram illustrating a contention-based random access procedure according to the present disclosure.

FIG. 9 shows a sequence diagram illustrating a contention-based random access procedure according to the present disclosure.

The random access procedure of FIG. 9 is similar to those of FIG. 8, and the difference lies in replacing steps S830 with steps S910 and S920 and replacing step S840 with step S930. At step S910, the first eNB informs the UE of a group of designated preamble indices or a group of designated PRACH subframes to be used at the second eNB. At step S920, the first eNB also informs the second eNB of the group of designated preamble indices or the group of designated PRACH subframes to be used at the second eNB. Although the step S910 is illustrated to occur before the step S920, it may be also occur after the step S920, or these two steps may occur simultaneously. Then, at step S930, the UE transmits to the second eNB a random access preamble (i.e., MSG1) using the group of designated preamble indices or the group of designated PRACH subframes instead of the dedicated preamble. For simplification, the remaining steps are not shown.

The random access procedure of FIG. 9 may work when all TDM UEs within a cell use the same set of subframes. That is, if a set of subframes, e.g., {0,1,2,5,6,7}, is used by TDM UE1 in cell A, all other TDM UEs use the same set of subframes.

Figure 10:
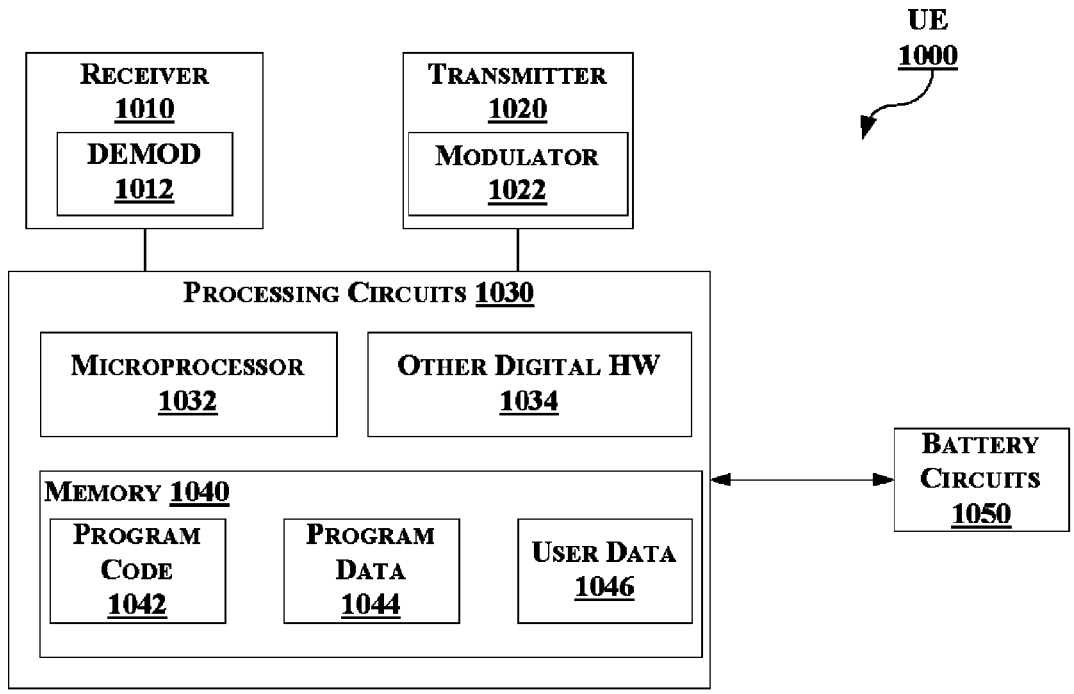
FIG. 10 is a block diagram of a UE 1000 configured according to the present disclosure.

FIG. 10 is a block diagram of a UE 1000 having been in communications with a first base station, for performing a random access to a second base station, according to the present disclosure. In particular, UE 1000 may be configured to participate in the method illustrated in FIG. 5, or variants thereof. Also, UE 1000 may serve as the UE of FIGS. 7-9.

As shown, the UE 1000 includes a receiver circuit 1010, which includes at least two antennas and various like radio-frequency components (not shown) and a demodulator 1012. The receiver 1010 receives radio signals received from one or more BSs, and processes the signals by using known radio processing and signal processing techniques, for the processor circuits 1030. The processing circuits 1030 extract data from signals received via the receiver 1010 and generate information for transmission to a corresponding eNB via the transmitter circuit 1020. Like the receiver 1010 and the demodulator 1012, the transmitter 1020 and the modulator 1022 use known radio processing and signal processing components and techniques, typically according to a particular telecommunications standard such as LTE and LTE-A (Advanced), and are configured to format digital data and generate and condition a radio signal for transmission over the air.

The processing circuits 1030 include one or several microprocessors 1032, digital signal processors, and the like, as well as other digital hardware 1034 and memory circuit 1040. The memory 1040, which includes one or several types of memory such as read-only memory (ROM), random-access memory (RAM), cache memory, flash memory devices, optical storage devices, etc., stores program code 1042 for executing one or more telecommunications and/or data communications protocols and for carrying out one or more of the techniques described herein. The memory 1040 further stores program data 1044, user data 1046 received from the BS and to be transmitted to the BS, and also stores various parameters, pre-determined threshold values, and/or other program data for controlling the operation of the UE 1000. The UE 1000 includes various other features that are not shown, in addition to the battery circuits 1050 pictured in FIG. 10; these features, such as user interface circuitry, positioning circuits, and the like, are well known to those skilled in the art and are therefore not illustrated.

In various embodiments, processing circuits 1030, using appropriate program code 1042 stored in the memory 1040, are configured to implement one or more of the random access techniques described herein. Of course, not all of the steps of these techniques are necessarily performed in a single microprocessor or even in a single module.

Figure 11:
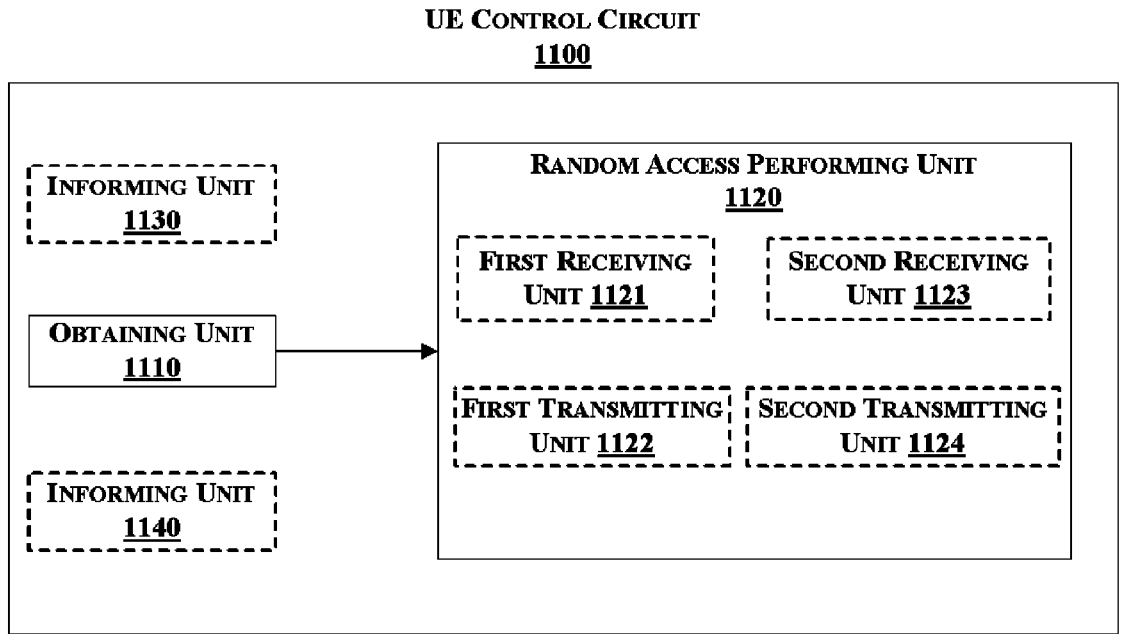
FIG. 11 illustrates a UE control circuit 1100 according to the present disclosure.

Thus, FIG. 11 presents a more generalized view of a UE control circuit 1100 configured to carry out one or several of the random access techniques described herein. The UE control circuit 1100 here may be also considered as a UE of the present disclosure. This UE control circuit 1100 may have a physical configuration that corresponds directly to the processing circuits 1030, for example, or may be embodied in two or more modules or units, like the configuration illustrated in FIG. 11, and may be implemented as hardware, software or a combination of hardware and software. In any case, however, the UE control circuit 1100 is configured to implement at least two functions, which are pictured in FIG. 11 as an obtaining unit 1110 and a random access performing unit 1120.

The obtaining unit 1110 obtains from the first base station a subframe configuration for the UE. The subframe configuration here indicates a first set of subframes assigned to communications between the UE and the first base station and a second set of subframes assigned to communications between the UE and the second base station.

The random access performing unit 1120 performs the random access to the second base station based on the subframe configuration.

The random access performing unit 1120 comprises a first receiving unit 1121 configured to receive from the second base station a PDCCH order for initiating the random access.

Assume that the PDCCH order is received in subframe m, m is a positive integer. The random access performing unit 1120 further comprises a first transmitting unit 1122 configured to: transmit a random access preamble to the second base station in the first available UL subframe that is allowed to transmit PRACH in the second set of subframes following a subframe $m+k_1$, $k_1 \geq 6$, if the subframe $m+k_1$ is not in the first set of subframes.

Alternatively, the first transmitting unit 1122 is further configured to: transmit the random access preamble to the second base station in the subframe $m+k_1$, if the subframe $m+k_1$ is in the second set of subframes.

Alternatively, the random access performing unit 1120 may include a second receiving unit 1123 and a second transmitting unit 1124. The second receiving unit 1123 is configured to receive an associated Random Access-Radio Network Temporary Identity, RA-RNTI, from the second base station in subframe n, n being a positive integer. The second transmitting unit 1124 is configured to transmit an UL-Sharing Channel, UL-SCH, transport block to the second base station in the first available UL subframe in the second set of subframes following a subframe n+k$_2$, k$_2$≥6, if the subframe n+k$_2$ is in not the second set of subframes.

The second transmitting unit 1124 is further configured to transmit the UL-SCH transport block to the second base station in the subframe n+k$_2$, if the subframe n+k$_2$ is in the second set of subframes.

The UE 1100 may further include a first informing 1130 configured to inform the second base station via the first base station that the UE is going to establish the connection with the second base station.

The UE 1100 may further include a second informing unit 1140 configured to inform the second base station of the subframe configuration by using one or more designated preamble indices or in one or more designated Physical Radom Access Channel, PRACH, subframes.

Figure 12:
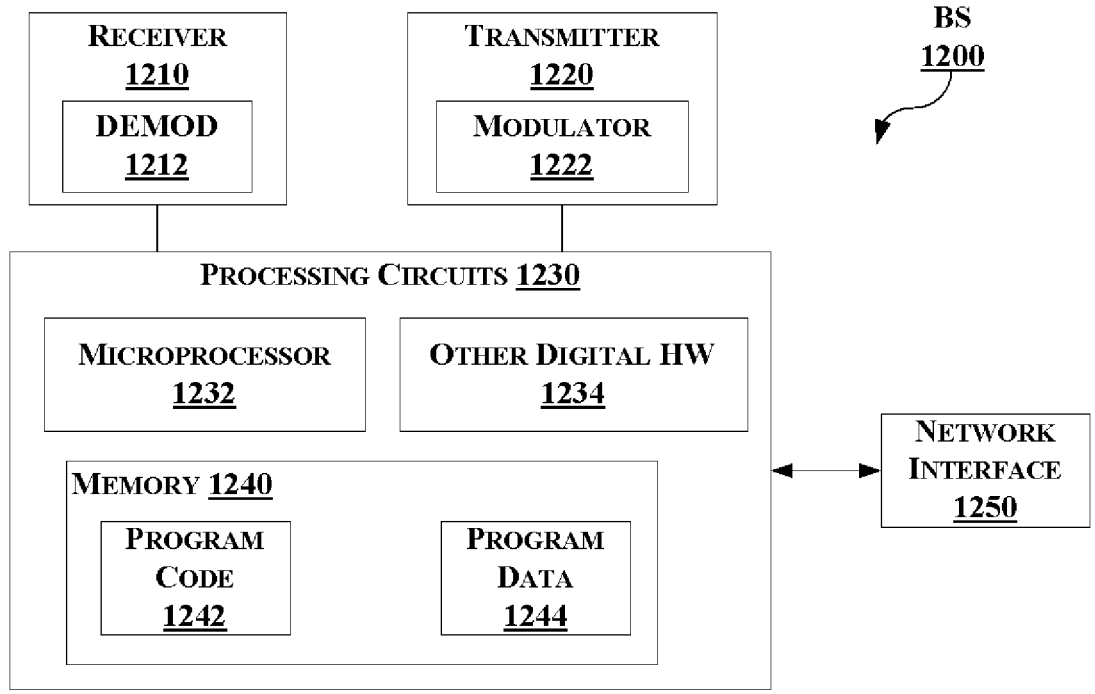
FIG. 12 is a block diagram of a BS 1200 configured according to the present disclosure.

FIG. 12 is a block diagram of a BS 1200 for establishing a connection with a UE according to the present disclosure, wherein the UE has been in a connection with a first base station. In particular, the BS 1200 may be configured to implement the method as illustrated in FIG. 6, or variants thereof. The BS 1200 may serve as the second eNB of FIGS. 7-9.

As shown, the BS 1200 includes a receiver circuit 1210, which includes at least two antennas and various other radio-frequency components (not shown) and a demodulator circuit 1212. The receiver 1210 receives radio signals received from one or more wireless BS, and processes the signals by using known radio processing and signal processing techniques, to convert the received radio signals into digital samples for processor circuits 1230. More particularly, the receiver 1210 is capable of receiving a random access preamble from the UE by means of sits antennas. The processing circuits 1230 extract data from signals received via the receiver 1210 and generate information for transmission to the UE via transmitter circuit 1220. Like the receiver 1210 and the demodulator 1212, the transmitter 1220 and modulator 1222 use known radio processing and signal processing components and techniques, typically according to one or more telecommunications standards, and are configured to format digital data and generate and condition a radio signal, from that data, for transmission over the air.

The processing circuits 1230 include one or several microprocessors 1232, digital signal processors, and the like, as well as other digital hardware 1234 and memory circuit 1240. The memory 1240, which may include one or several types of memory such as read-only memory (ROM), random-access memory (RAM), cache memory, flash memory devices, optical storage devices, etc., stores program code 1242 for executing one or more telecommunications and/or data communications protocols and for carrying out one or more of the techniques for signaling random access-related information described herein. Memory 1240 further stores program data 1244 as well as buffered traffic data received from UEs and from network interface 1250, and also stores various parameters, predetermined threshold values, and/or other program data for controlling the general operation of the BS 1200.

In some embodiments, the processing circuits 1230, using appropriate program code 1242 stored in the memory 1240, are configured to implement one or more of the techniques described herein. Of course, not all of the steps of these techniques are necessarily performed in a single microprocessor or even in a single module.

Figure 13:
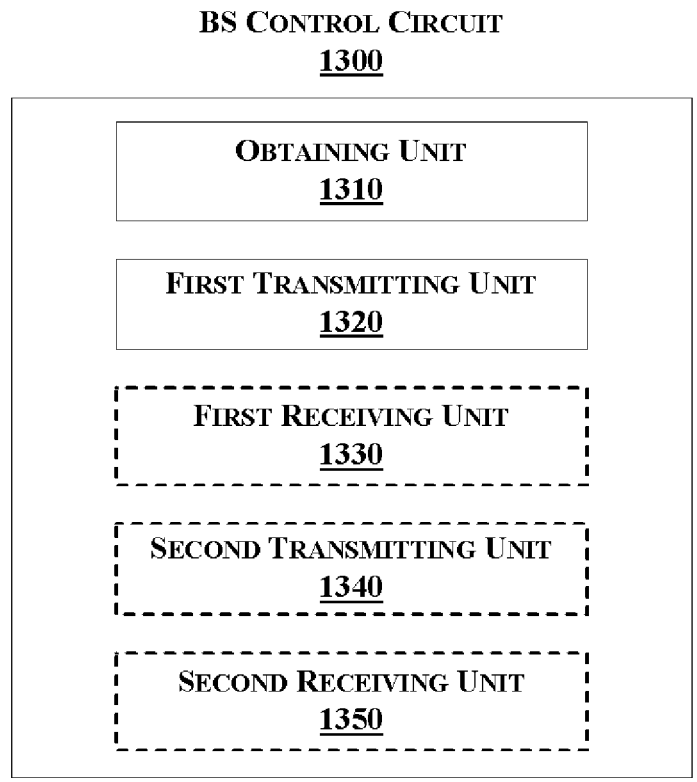
FIG. 13 illustrates a BS control circuit 1300 according to the present disclosure.

Thus, FIG. 13 presents a more generalized view of a BS control circuit 1300 configured to carry out one or several of the connection establishing techniques discussed herein according to the present disclosure. The BS control circuit 1300 here may be also considered as a BS of the present disclosure. This BS control circuit 1300 may have a physical configuration that corresponds directly to the processing circuits 1230, for example, or may be embodied in two or more modules or units, like the configuration illustrated in FIG. 13, and may be implemented as hardware, software or a combination of hardware and software. In any case, however, the BS control circuit 1300 is configured to implement at least five functions, which are pictured in FIG. 13 as an obtaining unit 1310 and a first transmitting unit 1320.

The obtaining unit 1310 obtains from the first base station a subframe configuration for the UE. The subframe configuration indicates a first set of subframes assigned to communications between the UE and the first base station and a second set of subframes assigned to communications between the UE and the second base station.

The first transmitting unit 1320 is configured to transmit to the UE a PDCCH order for initiating the random access.

Assume that the first transmitting unit 1320 transmits the PDCCH order to the UE in subframe m, and m is a positive integer. The BS control circuit 1300 further includes a first receiving unit 1330 configured to receive a random access preamble from the UE in the first available UL subframe that is allowed to transmit PRACH in the second set of subframes following a subframe m+k$_1$, k$_1$≥6, if the subframe m+k$_1$ is not in the second set of subframes.

The first receiving unit 1330 is further configured to receive the random access preamble from the UE in the subframe m+k$_1$, if the subframe m+k$_1$ is in the second set of subframes.

The BS control circuit 1300 further includes a second transmitting unit 1340 and a second receiving unit 1350. The second transmitting unit 1340 is configured to transmit an associated Random Access-Radio Network Temporary Identity, RA-RNTI, to the UE in subframe n, n being a positive integer. The second receiving unit 1350 is configured to receive from the UE an UL-Sharing Channel, UL-SCH, transport block in the first available UL subframe in the second set of subframes following a subframe n+k$_2$, k$_2$≥6, if the subframe n+k$_2$ is not in the second set of subframes.

The second receiving unit 1350 is further configured to receive from the UE the UL-SCH transport block in the subframe n+k$_2$, if the subframe n+k$_2$ is in the second set of subframes.

It should be noted that two or more different units in this disclosure may be logically or physically combined. For example, the first receiving unit 1131 and the second receiving unit 1132 may be combined as one single unit.

Although the present technology has been described above with reference to specific embodiments, it is not intended to be limited to the specific form set forth herein. For example, the embodiments presented herein are not limited to the existing LTE system; rather they are equally applicable to new communication standards defined in future. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

What is claimed is:

1. A method used in a User Equipment, UE, for performing a random access to a second base station, the UE having been in communications with a first base station, the method comprising:
   obtaining from the first base station a subframe configuration for the UE, which indicates a first set of subframes assigned to communications between the UE and the first base station and a second set of subframes assigned to communications between the UE and the second base station; and
   performing the random access to the second base station based on the subframe configuration;
   wherein the UE performs random access to the second base station in the second set of subframes on the same frequencies used for communications between the UE and the first base station in the first set of subframes.

2. The method according to claim 1, wherein performing the random access to the second base station comprises:
   receiving from the second base station a Physical Downlink Control Channel, PDCCH, order for initiating the random access.

3. The method according to claim 2, wherein if the PDCCH order is received in subframe m, m being a positive integer, performing the random access to the second base station further comprises:
   transmitting a random access preamble to the second base station in a first available uplink subframe in the second set of subframes following a subframe $m+k_1$, $k_1 \geq 6$, if the subframe $m+k_1$ is not in the second set of subframes.

4. The method according to claim 3, wherein performing the random access to the second base station further comprises:
   transmitting the random access preamble to the second base station in the subframe $m+k_1$, if the subframe $m+k_1$ is in the second set of subframes.

5. The method according to claim 2, wherein, before receiving the PDCCH order, the method further comprising:
   informing the second base station via the first base station that the UE is going to establish a connection with the second base station.

6. The method according to claim 1, wherein performing the random access to the second base station comprises:
   receiving an associated Random Access-Radio Network Temporary Identity, RA-RNTI, from the second base station in subframe n, n being a positive integer; and
   transmitting an Uplink-Sharing Channel, UL-SCH, transport block to the second base station in a first available uplink subframe in the second set of subframes following a subframe $n+k_2$, $k_2 \geq 6$, if the subframe $n+k_2$ is not the second set of subframes.

7. The method according to claim 6, wherein performing the random access to the second base station further comprises:
   transmitting the UL-SCH transport block to the second base station in the subframe $n+k_2$, if the subframe $n+k_2$ is in the second set of subframes.

8. The method according to claim 1, further comprising:
   informing the second base station of the subframe configuration by using one or more designated preamble indices or in one or more designated Physical Radom Access Channel, PRACH, subframes.

9. A User Equipment, UE, for establishing a connection with a second base station, the UE having been in a connection with a first base station, the UE comprising a processing circuit configured to perform the method according to claim 1.

10. A method used in a second base station for establishing a connection with a User Equipment, UE, the UE having been in a connection with a first base station, the method comprising:
   obtaining from the first base station a subframe configuration for the UE, which indicates a first set of subframes assigned to communications between the UE and the first base station and a second set of subframes assigned to communications between the UE and the second base station;
   transmitting to the UE a Physical Downlink Control Channel, PDCCH, order for initiating random access to the second base station;
   wherein the second base station transmits the PDCCH order for initiating random access to the second base station to the UE in the second set of subframes on the same frequencies used for communications between the UE and the first base station in the first set of subframes.

11. The method according to claim 10, wherein if the PDCCH order is transmitted to the UE in subframe m, m being a positive integer, the method further comprising:
   receiving a random access preamble from the UE in a first available uplink subframe that is allowed to transmit PRACH in the second set of subframes following a subframe $m+k_1$, $k_1 \geq 6$, if the subframe $m+k_1$ is not in the second set of subframes.

12. The method according to claim 11, the method further comprising:
   receiving the random access preamble from the UE in the subframe $m+k_1$, if the subframe $m+k_1$ is in the second set of subframes.

13. The method according to claim 10, the method further comprising:
   transmitting an associated Random Access-Radio Network Temporary Identity, RA-RNTI, to the UE in subframe n, n being a positive integer; and
   receiving from the UE an Uplink-Sharing Channel, UL-SCH, transport block in a first available uplink subframe in the second set of subframes following a subframe $n+k_2$, $k_2 \geq 6$, if the subframe $n+k_2$ is not in the second set of subframes.

14. The method according to claim 13, the method further comprising:
   receiving from the UE the UL-SCH transport block in the subframe $n+k_2$, if the subframe $n+k_2$ is in the second set of subframes.

15. A second base station for establishing a connection with a User Equipment, UE, the UE having been in a connection with a first base station, the second base station comprising a processing circuit configured to perform the method according to claim 10.

16. A User Equipment, UE having been in communications with a first base station, for performing a random access to a second base station, the UE comprising:
   a control circuit configured to:
      obtain from the first base station a subframe configuration for the UE, which indicates a first set of subframes assigned to communications between the UE and the first base station and a second set of subframes assigned to communications between the UE and the second base station; and
      perform the random access to the second base station based on the subframe configuration;

wherein the UE is configured to perform random access to the second base station in the second set of subframes on the same frequencies used for communications between the UE and the first base station in the first set of subframes.

17. The UE according to claim 16, wherein the UE further comprises a first receiver configured to receive from the second base station a Physical Downlink Control Channel, PDCCH, order for initiating the random access.

18. The UE according to claim 17, wherein if the PDCCH order is received in subframe m, m being a positive integer, the UE further comprises a first transmitter configured to:
   transmit a random access preamble to the second base station in the first available uplink subframe that is allowed to transmit PRACH in the second set of subframes following a subframe $m+k_1$, $k_1>6$, if the subframe $m+k_1$ is not in the first set of subframes.

19. The UE according to claim 18, wherein the first transmitter is further configured to:
   transmit the random access preamble to the second base station in the subframe $m+k_1$, if the subframe $m+k_1$ is in the second set of subframes.

20. The UE according to claim 17, wherein the control circuit is further configured to inform the second base station via the first base station that the UE is going to establish the connection with the second base station.

21. The UE according to claim 16, wherein the UE further comprises:
   a second receiver configured to receive an associated Random Access-Radio Network Temporary Identity, RA-RNTI, from the second base station in subframe n, n being a positive integer; and
   a second transmitter configured to transmit an Uplink-Sharing Channel, UL-SCH, transport block to the second base station in a first available uplink subframe in the second set of subframes following a subframe $n+k_2$, $k_2>6$, if the subframe $n+k_2$ is in not the second set of subframes.

22. The UE according to claim 21, wherein the second transmitter is further configured to transmit the UL-SCH transport block to the second base station in the subframe $n+k_2$, if the subframe $n+k_2$ is in the second set of subframes.

23. The UE according to claim 17, wherein the control circuit is further configured to inform the second base station of the subframe configuration by using one or more designated preamble indices or in one or more Physical Radom Access Channel, PRACH, subframes.

24. A second base station for establishing a connection with a User Equipment, UE, the UE having been in a connection with a first base station, the second base station comprising:
   a control circuit configured to obtain from the first base station a subframe configuration for the UE, which indicates a first set of subframes assigned to communications between the UE and the first base station and a second set of subframes assigned to communications between the UE and the second base station;
   a first transmitter configured to transmit to the UE a Physical Downlink Control Channel, PDCCH, order for initiating the random access;
   wherein the first transmitter is configured to transmit the PDCCH order for initiating random access to the second base station to the UE on the second set of subframes on the same frequencies used for communications between the UE and the first base station in the first set of subframes.

25. The second base station according to claim 24, wherein if the first transmitter transmits the PDCCH order to the UE in subframe m, m being a positive integer, the second base station further comprises: a first receiver configured to receive a random access preamble from the UE in the first available uplink subframe that is allowed to transmit PRACH in the second set of subframes following a subframe $m+k_1$, $k_1>6$, if the subframe $m+k_1$ is not in the second set of subframes.

26. The second base station according to claim 25, wherein the first receiver is further configured to receive the random access preamble from the UE in the subframe $m+k_1$, if the subframe $m+k_1$ is in the second set of subframes.

27. The second base station according to claim 24, further comprising:
   a second transmitter configured to transmit an associated Random Access-Radio Network Temporary Identity, RA-RNTI, to the UE in subframe n, n being a positive integer, and
   a second receiver configured to receive from the UE an Uplink-Sharing Channel, UL-SCH, transport block in the first available uplink subframe in the second set of subframes following a subframe $n+k_2$, $k_2>6$, if the subframe $n+k_2$ is not in the second set of subframes.

28. The second base station according to claim 27, wherein the second receiver is further configured to receive from the UE the UL-SCH transport block in the subframe $n+k_2$, if the subframe $n+k_2$ is in the second set of subframes.

* * * * *